July 10, 1951  G. R. STURTEVANT ET AL  2,560,260
TEMPERATURE COMPENSATED MAGNETIC SUSPENSION
Filed July 12, 1949

Inventors:
George R. Sturtevant,
Floyd H. Busch,
by *Prowell S. Mack*
Their Attorney.

Patented July 10, 1951

2,560,260

UNITED STATES PATENT OFFICE 2,560,260

TEMPERATURE COMPENSATED MAGNETIC SUSPENSION

George R. Sturtevant, Swampscott, and Floyd H. Busch, Saugus, Mass., assignors to General Electric Company, a corporation of New York Application July 12, 1949, Serial No. 104,324

7 Claims. (Cl. 308—1)

Our invention relates to magnetic suspensions and, in particular, to means for compensating for the variation in lifting power that occurs with changes in temperature to which the suspension may be subjected. Magnetic suspensions are now being used on certain types of meters, for example, induction watthour meters where high accuracy is required and where the meter is often subject to wide variations in ambient temperature. It is known that most permanent magnets suffer a decrease in strength with rise in temperature, which strength is restored when the temperature falls again over the range of ambient temperature variation likely to be met with in practice, for example, from −20 to 100 degrees F. The extent of this variation varies with different kinds of permanent magnetic material. When the permanent magnets of a magnetic suspension of an induction watthour meter, for example, vary in temperature over such a range, its lifting power varies accordingly and may change the position of the rotary disk of the watthour meter in the air gap of the driving and drag magnets to a sufficient extent as to cause error.

Figure 2:
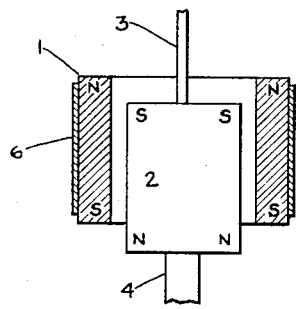
Figure 3:
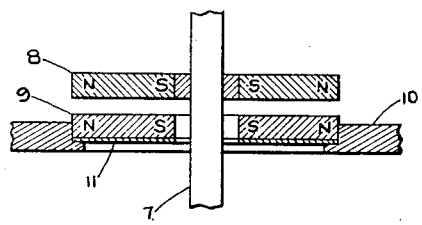

Our invention is directed to temperature compensating means for such magnetic suspensions to assure that the lifting power of the magnetic suspension will stay constant in order that the position of the rotary element which is suspended will remain in a fixed vertical position relative to the stationary parts of the meter under all ambient temperatures likely to be encountered in practice. The features of our invention which are believed to be novel and patentable will be pointed out in the claims appended hereto. For a better understanding of our invention, reference is made in the following description to the accompanying drawing in which Figs. 1 and 2 represent different forms of our invention as applied to a magnetic suspension of the type described in United States Patent No. 2,311,382, February 16, 1943, to Hansen, Jr.; and Fig. 3 illustrates the application of our invention to a repulsion type of magnetic suspension.

Figure 1:
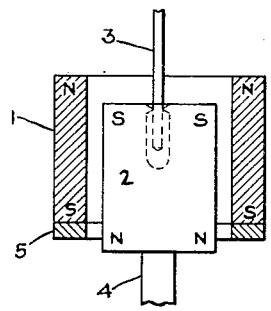

Referring now to Fig. 1, we have here represented a magnetic suspension consisting of a stationary outer hollow cylindrical permanent magnet 1 and an inner rotary cylindrical permanent magnet 2. The inner permanent magnet may be hollow and will generally contain a center top guide bearing for receiving a stationary guide pin 3, and will generally have a shaft 4 to be suspended, and which may be the shaft of a watthour meter, fastened in its lower central end. The inner magnet 2 with the shaft 4 and any parts carried thereby which we may term the rotor element will be free to move endwise to a limited extent. Guide bearings will maintain the inner and outer magnets concentric with each other. Magnetic attraction exists between the upper magnet poles of opposite polarity of the magnets and also between the lower magnetic poles of opposite polarity of such magnets, such that when the inner magnet 2 is lowered relative to the outer stationary magnet 1, these magnetic forces begin to have a vertical component which tends to lift and support the rotor element. The design of the suspension is such in relation to the weight of the rotating element that the latter will be supported by such magnetic suspension forces at about the relative vertical positions of the magnets illustrated. If weight is added to the rotating element, the inner magnet will sink, increasing the magnetic lifting forces; and if weight is removed from the rotor element, the inner magnet will rise, decreasing the magnetic lifting forces until a balance is reached within reasonable limits. Likewise, if the strength of the magnets is increased or decreased, the rotor element position will rise or fall accordingly until a balance is reached between the magnetic lifting forces and the weight of the rotor element. Best economy of the suspension design is obtained when the lifting and weight forces are equal and stabilized at about the relative positions represented. It may be assumed that the weight supported will remain constant and, hence, if the strength of the permanent magnets remains constant, the vertical position of the rotor element will remain as represented. However, the magnetic strength of well stabilized permanent magnets generally has a tendency to change slightly with variations in temperature in the ambient temperature range, losing strength with a rise in temperature and regaining it again with a corresponding decrease in temperature. Hence, the rotating element will have a slightly lower stabilized position when the temperature is 90 degrees F. and a slightly higher stabilized position when the temperature is −10 degrees F. as compared to its position at 40 degrees F.

To avoid such change in position of the rotor element with change in temperature, we provide in Fig. 1 a temperature compensating washer 5 fixed to one end of one of the magnets and, in this case, to the lower end of the outer magnet 1. The washer 5 is made of a non-permanent, magnetic material of low permeability and having a negative temperature coefficient of permeability and may, for example, be an alloy of about 70 per cent nickel and 30 per cent copper, or it may be made of a nickel-iron alloy, the nickel content being about 30 per cent. Negative temperature coefficient of permeability alloys of this character are known which have a substantially linear negative temperature coefficient of permeability from −20 to 100 degrees F., and a relatively low inherent permeability.

Placing such material at the lower end of the magnet 1 tends to elongate the flux pattern of such magnet in a downward direction, and this tendency decreases with rise in temperature. Hence, at low ambient temperatures, the flux pattern of the outer magnet is lowered and rises slightly with increase in temperature as the permeability of the part 5 decreases. It does not change the magnitude of the useful flux of the magnet but merely its pattern, and has the effect of lowering the position of the south pole of magnet 1 slightly and lowering it most at low temperatures and least at high temperatures. If the strength of both permanent magnets remained constant with change in temperature, the presence of part 5 would be detrimental because it would raise the position of the rotating element with rise in temperature, but as pointed out previously, the strength of the permanent magnets tends to decrease with rise in temperature and to lower the position of the rotating element. Hence, compensator 5 is used to offset the decrease in strength of both permanent magnets with rise in temperature, and to maintain the vertical position of the rotating element constant at all ambient temperatures likely to be encountered. The washer 5 is preferably made of the same inner and outer diameter as the magnet 1, and of a thickness sufficient to compensate for the change in magnetic strength of both permanent magnets. The exact thickness dimension will depend upon the temperature permeability characteristics of the material used in 5 and the extent to which the strength of the permanent magnets varies with temperature, and best results will be obtained by trial after the material and general design of the permanent magnets have been decided upon. The compensation, however, will enable the use of permanent magnet material which could not otherwise be used because of the high temperature sensitivity. An equivalent compensating result would be obtained by using such a compensator on the upper end of the rotor magnet 2, but we prefer to use it on the stationary magnet because then it adds no weight to be suspended.

In Fig. 2, there is represented another way of compensating for the phenomenon described. Except for the compensation, the suspension may be as described in Fig. 1, except that possibly it will be desirable to increase the radial thickness of the outer magnet 1 slightly in comparison to the weight to be supported. In Fig. 2, a thin outer cylinder 6 of a material having a negative temperature coefficient of permeability is mounted closely about the outer cylinder, and shunts more or less of the flux of such magnet between its poles and, hence, decreases the useful flux thereof accordingly. It will shunt more flux at low temperatures than at high temperatures, and is of a thickness and has characteristics which will compensate for the decrease in flux strength of both permanent magnets with rise in temperature and maintain the lifting strength of the suspension as a whole constant. As in Fig. 1, such compensation could be applied to the inner instead of to the outer magnet, or partially to both, with suitable consideration being given to the effect of the compensator on the magnetic forces. It will be desirable to shunt the least amount of flux possible and still obtain the desired compensation with the arrangement of Fig. 2, because this type of compensation not only changes the flux pattern but also robs the suspension of useful flux.

In Fig. 3, there is shown a magnetic suspension for vertical shafts which is of the magnetic repulsion type and to which our invention has been applied. The rotary suspended shaft is partially shown at 7. Mounted concentrically thereon is a washer-shaped permanent magnet 8 which is polarized radially as indicated. A stationary permanent magnet 9 of like construction and polarization is mounted concentric to shaft 7 below and parallel to magnet 8 by supporting structure indicated at 10. Guide bearings for shaft 7 will maintain the concentric relationship and allow limited axial displacement of the rotor. It is evident that the adjacent poles at the inner and outer peripheries of the two magnets with like poles in vertical alignment will provide a repulsion lifting force on the rotary magnet 8 and shaft 7, which lifting force will increase with a decrease in the vertical spacing between the magnets. This suspension will be designed in relation to the weight to be suspended so that a stable balance condition will exist when the spacing between the magnets is small, for example, less than ¼ inch. In cases where the suspension is to be used in devices where there is a considerable change in ambient temperature and an exacting vertical position of the rotating element is necessary, temperature compensation to prevent changes in such vertical position due to changes in the strength of the permanent magnets will be desirable. A thin washer-shaped sheet of a material having a negative coefficient of permeability may be used on one face of one or more of the magnets, preferably the stationary magnet where it does not add to the weight to be supported. Such a compensator shunt is represented at 11 over the lower face of the stationary magnet 9. At low temperatures it decreases the useful repulsion flux of the lower magnet and as the temperature increases, the effect of the compensating shunt is reduced.

In all cases described, it is important that any compensating part which is added be magnetically symmetrical with respect to the axis of rotation, so as not to introduce any sidewise pull on the rotating element.

What we claim as new and desire to secure by Letters Patent of the United States is:

1. A magnetic suspension comprising two permanent magnets one of which is stationary and the other of which is movable in a vertical direction, said magnets being positioned adjacent each other and polarized in such directions that the magnetomotive forces between such magnets serve to produce a lifting force on the movable magnet, which lifting force increases as the movable magnet is lowered and decreases as the movable magnet is raised over a limited range of movement relative to the stationary magnet, and means for compensating such suspension for a decrease in the magnetic strength of such magnets due to an increase in ambient temperature comprising a non-permanent magnetic material which has a negative temperature coefficient of permeability secured in contact with one of said magnets in such a position as to vary the flux pattern of such magnet with change in ambient temperature as to compensate for any variation in permanent magnet flux strength and lifting force in the suspension.

2. A temperature compensated magnetic suspension comprising two permanent magnets one of which is stationary and the other of which is movable in a vertical direction, said magnets being positioned spaced apart adjacent each other and polarized in such directions that the magnetomotive force between them serves to produce a lifting force on the movable magnet, which lifting force increases and decreases with the lowering and raising of the movable magnet over a limited range relative to the stationary magnet, and means for compensating such suspension for a decrease in the magnetic strength of such magnets due to an increase in ambient temperature comprising a non-permanent magnetic material which has a negative temperature coefficient of permeability secured in contact with one of such magnets in such a position as to vary the flux pattern of such magnet with changes in ambient temperature and to compensate for any variation in permanent magnet flux strength in the suspension caused by such variation in temperature such that the magnetic lifting force of the suspension is maintained constant for a given vertical position of the movable magnet relative to the stationary magnet.

3. A temperature compensated magnetic suspension comprising a pair of permanent magnets symmetrically disposed with respect to a vertical axis and positioned close together and out of contact with each other, one of said magnets being stationary and the other being movable in a vertical direction over a limited range, said magnets being polarized in such relative directions that the magnetomotive forces between them serve to produce a lifting force on the movable magnet which lifting force increases and decreases with the lowering and raising of the movable permanent magnet relative to the stationary magnet over a limited range, and means for compensating for any decrease in magnetic flux strength of the permanent magnets of said suspension due to an increase in ambient temperature comprising a piece of non-permanent magnetic material having a negative temperature coefficient of permeability, symmetrically disposed relative to said vertical axis and secured on the stationary permanent magnet, said compensating means serving to modify the flux distribution of said stationary magnet such that the lifting force of said suspension is maintained constant with variations in ambient temperature.

4. A temperature compensated magnetic suspension for vertical shafts comprising a hollow cylindrical permanent magnet and a cylindrical permanent magnet concentrically contained within and in spaced relation to the hollow magnet, a vertical shaft on which the inner magnet is concentrically mounted, a stationary support to which said hollow magnet is secured, said permanent magnets being polarized in opposite axial directions, and an extension secured on one end of one of said magnets made of a material having a negative temperature coefficient of permeability which serves to elongate the flux pattern of the magnet to which it is secured upon a decrease in temperature to compensate for any variation in flux strength of the permanent magnets of the suspension due to ambient temperature variations.

5. A temperature compensated magnetic suspension for vertical shafts comprising in combination with such a shaft a cylindrical permanent magnet concentrically mounted on said shaft, a stationary permanent magnet in the form of a hollow cylinder concentrically surrounding the shaft mounted magnet, said magnets being polarized in opposite axial directions and a washer-shaped piece of negative temperature coefficient of permeability material secured to the lower end of said hollow magnet and disposed symmetrically with respect to its axis.

6. A temperature compensated magnetic suspension for vertical shafts comprising inner and outer telescoping permanent magnets of cylindrical shape and concentrically disposed, said magnets being polarized in opposite axial directions, and temperature compensating means for said suspension comprising a thin layer of material having a negative temperature coefficient of permeability secured on a cylindrical wall of one of said magnets.

7. A temperature compensated magnetic suspension for vertical shafts comprising in combination with a rotary vertical shaft a permanent magnet mounted thereon, a stationary permanent magnet, said two magnets being concentrically and symmetrically disposed with respect to said shaft and located in closely spaced relation with each other, said permanent magnets being polarized in such directions as will cause their magnetomotive forces to produce a lifting action on the shaft, and means having a negative temperature coefficient of permeability fixed in shunting relation between magnetic poles of one of said magnets and symmetrically disposed with respect to said shaft.

GEORGE R. STURTEVANT.
FLOYD H. BUSCH.

REFERENCES CITED

The following references are of record in the file of this patent:

UNITED STATES PATENTS

| Number | Name | Date |
|---|---|---|
| 1,398,463 | Lee | Nov. 29, 1921 |
| 1,947,187 | Clark | Feb. 13, 1934 |
| 2,254,698 | Hansen | Sept. 2, 1941 |
| 2,311,382 | Hansen | Feb. 16, 1943 |
| 2,346,683 | Hickok | Apr. 18, 1944 |